Nov. 2, 1937.   D. G. CLIFFORD   2,097,913
APPARATUS FOR LAYING PAVEMENT
Filed March 18, 1933   3 Sheets-Sheet 1

INVENTOR.
DELL G. CLIFFORD
BY
ATTORNEY

Nov. 2, 1937.    D. G. CLIFFORD    2,097,913
APPARATUS FOR LAYING PAVEMENT
Filed March 18, 1933    3 Sheets-Sheet 2
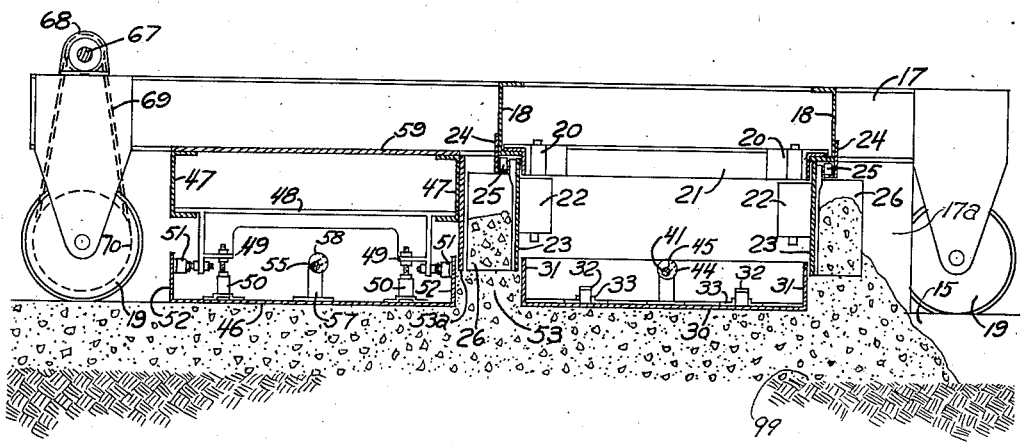
FIG. 2
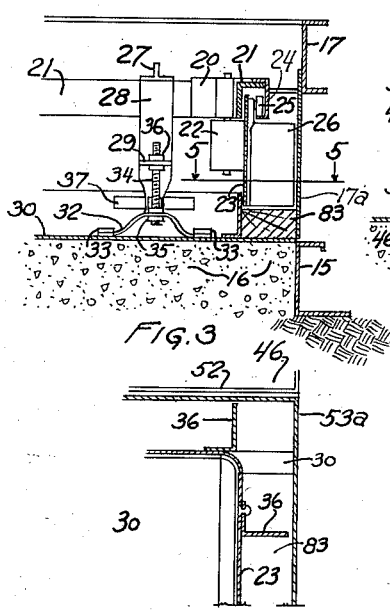
FIG. 3
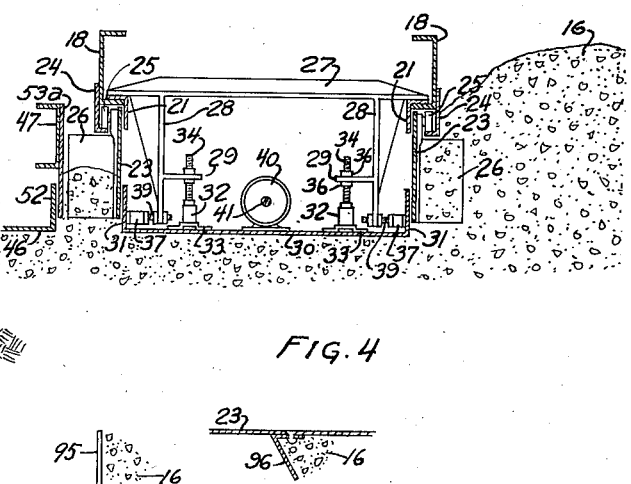
FIG. 4
FIG. 5
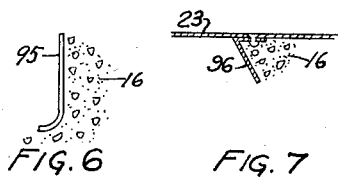
FIG. 6    FIG. 7
INVENTOR.
DELL G. CLIFFORD
BY
ATTORNEY Nov. 2, 1937.　　　　D. G. CLIFFORD　　　　2,097,913
APPARATUS FOR LAYING PAVEMENT
Filed March 18, 1933　　　3 Sheets-Sheet 3
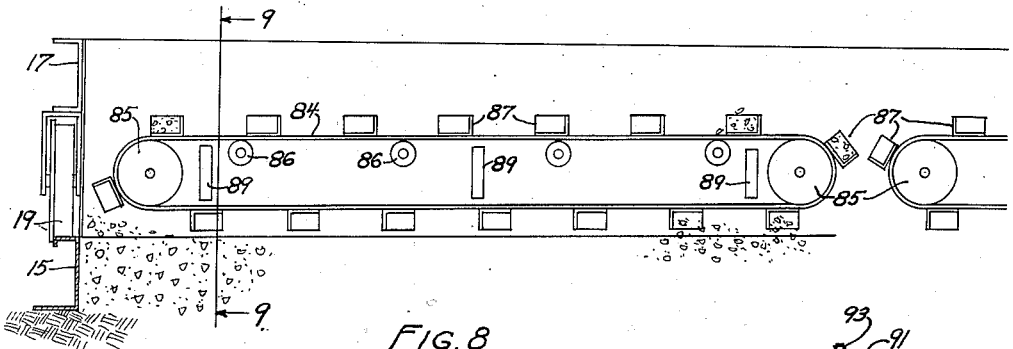
Fig. 8
Fig. 10　　　Fig. 9
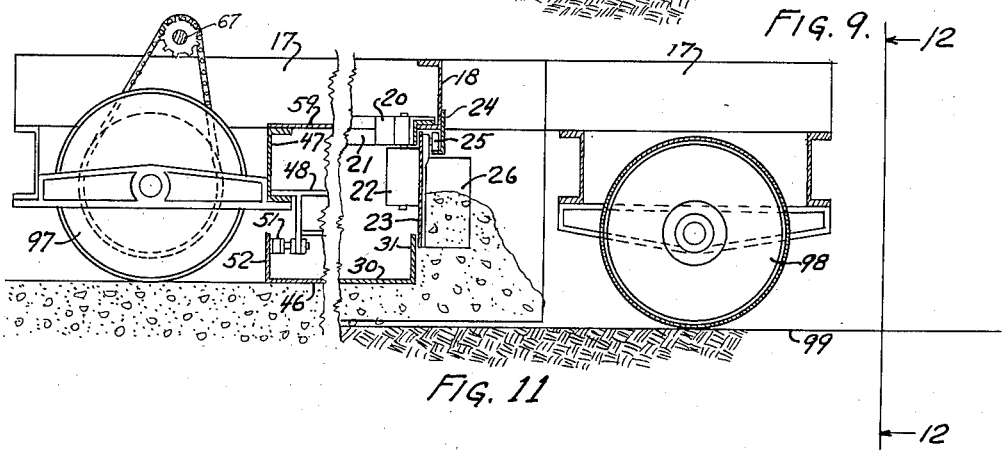
Fig. 11
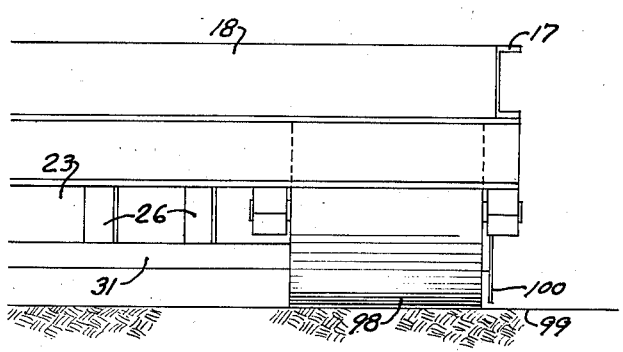
Fig. 12
INVENTOR.
DELL G. CLIFFORD
ATTORNEY Patented Nov. 2, 1937

2,097,913

UNITED STATES PATENT OFFICE 2,097,913

APPARATUS FOR LAYING PAVEMENT

Dell G. Clifford, Chicago, Ill.

Application March 18, 1933, Serial No. 661,490

22 Claims. (Cl. 94—44)

This invention relates to improvements in method of laying pavement, and an improved machine or apparatus for carrying the method into operation.

The method consists in dumping or piling the mixed material directly upon the bed or sub-base upon which it is to be laid, and then advancing a machine or apparatus up to the supply to remove the material therefrom, gradually advancing the machine as the material is removed and conveying away and spreading the material over the surface upon which it is to be laid, thereby rendering it possible to relieve the machine or apparatus of the weight of the entire supply, and at the same time effecting a uniform and efficient distribution of the material.

A further object is to provide in a machine of this character improved means whereby any spaces or voids which may occur in the laid material may be supplied with the material from the main supply, as the machine advances.

A further object is to provide in a machine of this character improved means for tamping and compacting the material as it is laid.

A further object is to provide in a machine of this character a plurality of vibrators and improved means whereby the vibrators may be made to operate in synchronism.

A further object is to provide a machine of this character which will be comparatively simple in construction, compact in arrangement and effective and efficient in operation.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which Figure 1 is a top plan view, partly broken away, of a machine of this character constructed in accordance with the principles of this invention.

Figure 2 is a detail sectional view taken on line 2—2, Figure 1.

Figure 3 is a detail sectional view taken on line 3—3, Figure 1.

Figure 4 is a detail sectional view taken on line 4—4, Figure 1.

Figure 5 is a detail sectional view taken on line 5—5, Figure 3, with parts omitted.

Figures 6 and 7 are detail views showing different forms of flights or wings which are connected to the conveyor for advancing the material.

Figure 8 is a detail view in vertical elevation, of a modified form of conveyor for the material.

Figure 9 is a detail sectional view taken on line 9—9, Figure 8.

Figure 10 is a detail sectional view, on an enlarged scale, showing a portion of one of the vibrators and the manner in which the vibrating means may be adjusted so as to cause the vibrator to operate in synchronism.

Figure 11 is a detail view partly in elevation and partly in section, and with parts broken away, of a portion of the apparatus showing one of the supporting wheels running on the laid material and another of the supporting wheels running on the sub-base.

Figure 12 is a detail elevation of a portion of Figure 11, as taken on line 12—12, Figure 11.

Figure 1:
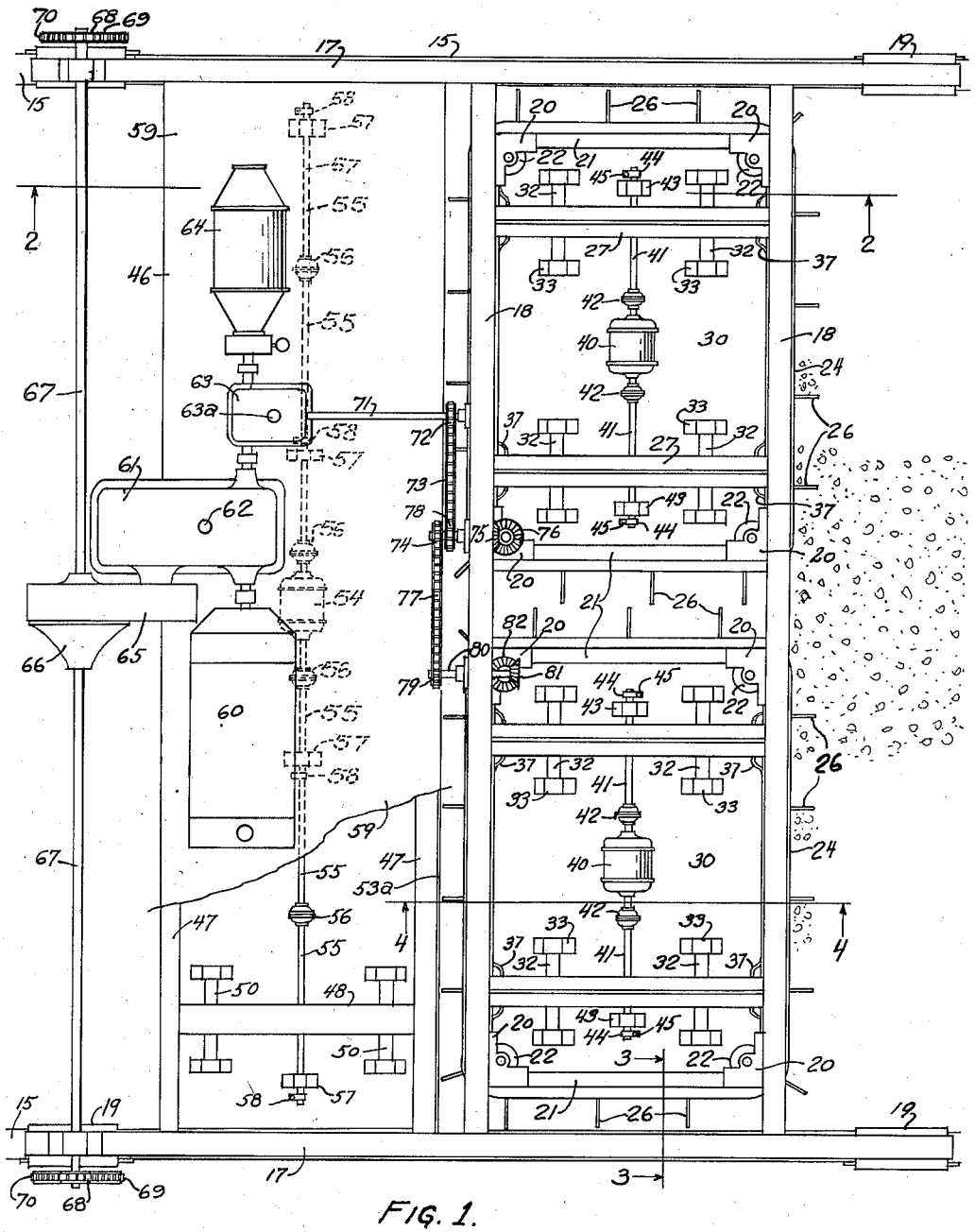

Referring more particularly to the drawings, the numeral 15 designates generally supporting tracks or guideways upon which the apparatus may be mounted to travel, and these tracks or guideways may be formed of any suitable material and of any suitable configuration, but may be preferably channel irons forming the side walls between which the material 16 is adapted to be laid upon the sub-base.

The apparatus consists essentially of a supporting frame structure embodying side bars or members 17 of any desired length and of any suitable configuration, preferably of channel iron formation held together by channel irons 18 secured to the side members and extending across the space therebetween. The frame thus formed may be supported upon rollers 19, which latter travel upon the tracks or guides 15. The cross bars 18 are spaced from each other in directions lengthwise of the side bars 17 for any suitable distance, and the open side of the channels are arranged toward each other so that the lower flange thereof will form supports for corner brackets 20 and end members 21. Any desired number of end members 21 and corner brackets 20 may be provided, according to the number of endless flexible elements, hereinafter described, to be used. In the present form of the invention two endless flexible members are employed.

Rollers 22 are journaled in the brackets 20 to rotate about upright axes and these rollers 22 are of any desired length to form guides over which an endless flexible member 23 is adapted to travel, one of the endless flexible members being provided for each of the frames thus formed. Carried by the cross bars 18 and secured to the outer face thereof are substantially L shaped members 24 which depend below and project under the lower flange of the members 18 and spaced from the lower face of such flange to form tracks or runways for the supporting rollers 25, which are secured preferably along the upper edge of the endless flexible member 23 for supporting the latter in a position that the rear face of the member 23 will contact with the vertical rollers 22 of the respective frames.

Connected with the endless member 23 are vertical wings or blades 26 which are arranged at substantially right angles to the member 23 and extend substantially throughout the width of the member 23 to terminate substantially adjacent the lower edge thereof. These wings or blades 26 are spaced laterally from each other for any desired distance so that when motion is imparted to the endless flexible member 23 the wings or blades 26 will travel around the respective frames formed by the cross bars or members 18 and the respective end bars or members 21.

Supported by the lower flange of the cross bars 18 and extending across the space therebetween and within the respective frames are supporting members 27 of any desired configuration, and these members may be secured permanently in position in any suitable manner.

Depending from the members 27 and within the frame are uprights 28 provided with laterally projecting portions 29 extending towards each other to form brackets for supporting a vibrator plate 30. The plate 30 is preferably constructed of any suitable material, and is provided with upwardly projecting flanges 31 extending substantially therearound and disposed adjacent the rear face of the endless flexible members 23. The upper extremities of the flanges 31 project above the lower edges of the endless flexible member so that the vibrator plate 30, when it is vibrated, will move independently with respect to the members 23.

The vibrator plate is held in position preferably by means of substantially U shaped springs 32, the extremities of which pass beneath loops or eyes 33 secured to the vibrator plate. Connected with the springs 32 and extending therethrough is a threaded bar or rod 34 which passes through the springs and is secured in position by suitable nuts or collars 35. These rods or bars pass through the brackets 29 and are secured in position by suitable nuts or collars 36, so that the vibrator plate 30 will be supported from the cross bars 18 through the medium of the members 27. Obviously, any desired number of these supporting brackets and springs 32 may be employed.

Secured also to the depending portions 28 of the members 27 are additional springs 37 constructed and mounted in the same manner as the springs 32, but the springs 37 are arranged transverse to the springs 32, so that the free ends of the springs 37 will press against the upright flanges 31 of the vibrator plate 30, fastening bolts 39, similar to the bolts 34 being employed to secure the springs 37 in position.

With this construction it will be manifest that the vibrator plate 30 will not only be flexible in itself, but will move independently of the endless conveyor members 23, and will also be adapted for yielding movement while at the same time the springs 37 will maintain the flanged portions 31 of the vibrator plate against excessive lateral movement.

Mounted upon each of the vibrator plates 30 is a motor 40 of any desired construction, and shafts 41 are connected by means of universal couplings 42 with the motor shaft. Each of the shafts 41 may be journaled in a suitable bearing 43 carried by the respective vibrator plates and secured to each of the shafts 41 preferably adjacent the free ends thereof, are eccentrics 44 arranged so as to produce when rotated a vibration of the plate. The eccentrics 44 are preferably secured to the respective shafts 41 by means of a fastening screw or device 45, so that by loosening the fastening device the respective eccentrics may be rotated about the axes of the shafts 41 and properly positioned so that if desired the vibrators will operate in synchronism.

By mounting the eccentrics at a distance from the motor and beyond the universal couplings, the motor will be relieved of wear caused by the action of the eccentrics.

An additional vibrator plate 46 may be provided which preferably extends substantially across the space between the side bars or members 17 of the supporting structure, and this vibrator plate 46 is supported in any suitable manner, such as by means of cross bars 47 preferably in the form of angle irons upon which are mounted a suitable number of members 48 having flanges or brackets 49 depending therefrom and to which brackets 49 are secured springs 50 which are preferably constructed and mounted in a manner similar to the construction and mounting of the springs 32. Additional springs 51 are also connected with the supporting member 48 in a manner similar to the construction and mounting of the springs 37, and these springs 51 contact with the upwardly projecting flange 52 encompassing the vibrator plate 46.

Any suitable number of springs 50 and 51 may be provided with their respective anchoring and supporting means. The vibrator plate 46 is preferably of a length substantially equal to the combined length of the vibrator plates 30 and is arranged in the rear thereof and spaced for a suitable distance therefrom so that the flanges 31 of the vibrator plates 30 and the adjacent flange 52 of the vibrator plate 46 will form a space 53 therebetween (see Figure 2) to constitute what might be termed a hopper or space for a reserve supply of material to be spread over the material laid to fill any spaces or voids formed as the machine advances.

A plate 53a may be provided to form one wall of such hopper or space to hold the material in place which is deposited in such space. This plate also serves as a guard to prevent material from falling on to the vibrator plate 46.

Mounted upon the vibrator plate 46 is a motor 54, and connected to the shafts of the motor 54 are shaft sections 55 connected together by universal joints 56. The shafts 55 are mounted in suitable bearings 57 and secured to the respective shafts 55 are eccentrics 58 arranged in any suitable position, these eccentrics being constructed and secured to the respective shafts in the same manner as the eccentrics 44 are secured to their shafts. This will enable the adjustment of the eccentrics 58 about the respective shafts so as to cause the vibrator plates to vibrate in synchronism.

Mounted upon and supported by the cross bars 47 is a plate or platform 59 and supported by the platform is a suitable motor 60 preferably in the form of an engine, the shaft of which may be connected to a suitable speed reduction and shifting mechanism indicated diagrammatically by the reference numeral 61. A control lever 62 may be provided for the speed reduction change and connected also to the speed reduction is a transmission 63 controlled by a shaft lever 63a. An electric generator 64 for the motors 40 may also be mounted upon the platform 59.

The apparatus is adapted to be advanced along the tracks or guide members 15 in any suitable manner, and to that end there may be provided a driving belt 65 connected to a differential 66, which in turn has connection with a shaft 67, and the shaft 67 is provided with a pulley 68 thereon (see Figures 1 and 2), over which an endless driving element 69 passes and the driving element also passes over a gear or pulley 70 secured to the wheels 19 at one end of the machine.

Motion is imparted to the endless flexible members 23 from the transmission mechanism 63 through the medium of a shaft 71 connected with which is a sprocket wheel 72, over which a sprocket chain 73 passes, the sprocket chain passing over a sprocket gear 74 to the shaft of which latter is connected a beveled gear 75 that meshes with a gear 76 carried by one of the rollers 22. A second sprocket chain 77 passes over a sprocket gear 78 that is connected with the sprocket gear 74 and the chain 77 also passes over a sprocket wheel 79 connected to a shaft 80, and to which shaft is connected a beveled gear 81 that meshes with a beveled gear 82 connected with another one of the rollers 22.

In order that the endless flexible members 23 may be moved to travel towards each other at the front of the machine, the beveled gears 75—81 are arranged to engage on opposite sides of the respective beveled gears 76—82.

By reason of the various control levers for the speed reduction and change mechanism 61 as well as the gear shift 63, it will be manifest that the speed of operation of the endless conveyors 23 with respect to the speed of advancing movement of the mechanism may be varied.

It is thought that from the above the operation of the mechanism will be clearly understood, but briefly stated it is as follows.

The material 16 to be distributed is dumped or piled upon the sub-base 17 in advance of the machine, as shown more clearly in Figures 2 and 4, and the endless conveyors are then set in operation so as to remove the material from the pile and convey the same across the sub-base, a portion of the material traveling around the frames to be discharged into the space 53 (see Figure 2) between the flanges 31 and 52 of the vibrator plates 30 and 46. As the machine advances and as the vibrators 30 and 46 move over the laid material, the plates will be vibrated by the vibrating mechanism, the vibrating plate 46 advancing and operating upon the material which has been previously laid and operated upon by the vibrator plate 30.

The upturned flanges 31 and 52 of the vibrator plates serve as a means for assisting in leveling the material.

Inasmuch as the wings or blades 26 pass over portions of the vibrator plates at the end runs of the conveyors, and terminate short of or are spaced above the plate, filler blocks 83 (see particularly Figures 3 and 5) may be employed to fill the space between the lower extremities of the blades or wings and the adjacent surface of the vibrator plate so that there will be no deposit of the material upon the vibrator plate. The material carried by the wings or blades 26 and which is moving over the filler blocks 83 will be carried by the conveyors to the rear of the vibrator plates 30 and deposited in the space 53 to fill in the voids or vacancies left in the material that is laid.

A vertical plate 53a may be supported by the member or cross bar 47 to project below the upper edge of the flange 52 of the vibrator plate 46, and serves to form one wall of the hopper or space between the vibrator plates 46 and 30 and also operates to prevent material from falling over and on top of the vibrator plate 46.

In the event that there is no necessity for depositing material in the space 53, the material carried by the blades or wings 26 will be carried through such space and again around to the front of the machine to be distributed in front of the machine.

In the form of the invention shown in Figures 8 and 9, the endless conveyors 84, corresponding to the endless conveyors 23 in the form shown in Figures 1 and 2, pass over pulleys or rollers 85 arranged to rotate about horizontal axes, and supporting rollers 86 are arranged to support the upper run of the conveyors. These conveyors 84 are provided with buckets or scoop shaped members 87 so as to pick up and distribute the material. Arranged in front of each of the conveyors is a shield 88, preferably disposed in an inclined plane so as to direct the material into the buckets 87. These shields are supported by suitable brackets 89 and the shield preferably terminates a considerable distance above the plane of operation of the vibrator plate 90, which corresponds with the vibrator plates 30 in the form shown in Figure 2.

In this form of the invention the conveyors 84 are operated from a shaft 91 journaled in suitable bearings and driven in any suitable manner from the source of power. Sprocket chains 92 pass over sprocket wheels 93 secured to the shaft 91 and also sprocket wheels 94 secured to the axis of one of the rollers 85.

The numerals 95 and 96 (see Figures 6 and 7) designate different types or forms of wings or blades which may be employed and secured to the endless conveyors 23, the form shown in Figure 6 being shaped to smooth and tamp the laid material. The form shown in Figure 7 is shaped and so connected to the belt as to draw the material against the belt.

In Figures 11 and 12 there is shown a type of machine in which the rear rollers 97 are supported by and run on the material which has been laid, while the front rollers 98 rest and run upon the sub-base 99. The rollers 97 and 98 are preferably of a considerable length as shown more clearly in Figure 12, so as to provide a sufficient bearing and supporting surface.

In this form of the invention a side plate 100 corresponding to the plate 17a in Figures 2 and 3, extends downwardly and terminates in close proximity to the surface of the sub-base 99 and serves as a means for preventing the material which is being laid, from spreading.

While the preferred forms of the invention have been herein shown and described, it is to be understood that various changes may be made in the details of construction and in the combination and arrangement of the several parts, within the scope of the claims, without departing from the spirit of this invention.

What is claimed as new is:—

1. A pavement laying machine embodying means for advancing the machine to a pile of material exterior of the machine, means for removing the material from such pile and directly distributing the same substantially uniformly over the surface upon which it is to be laid and while the material is maintained upon such surface, and vibrating means operating upon the material as it is laid.

2. A pavement laying machine embodying means for advancing the machine to a pile of material exterior of the machine, means for removing the material from such pile and directly distributing the same substantially uniformly over the surface upon which it is to be laid and while the material is maintained upon such surface, and a plurality of vibrating means successively operating upon predetermined areas of the material as it is laid and as the machine is advanced.

3. A pavement laying machine embodying means for advancing the machine to a pile of material exterior of the machine, means for removing the material from such pile and directly distributing the same substantially uniformly over the surface upon which it is to be laid and while the material is maintained upon such surface, a vibrator plate operating upon the material as it is laid, and means for causing portions of said vibrator plate to vibrate in the desired direction with respect to other portions of said plate.

4. A pavement laying machine embodying means for advancing the machine to a pile of material exterior of the machine, means for removing the material from such pile and directly distributing the same substantially uniformly over the surface upon which it is to be laid and while the material is maintained upon such surface, and vibrating means operating upon the material as it is laid, the second recited means also operating to convey material over the laid work and deposit the same in spaces formed in the laid material after the latter has been operated upon by said vibrating means.

5. A pavement laying machine embodying means for advancing the machine to a pile of material exterior of the machine, means for removing the material from such pile and directly distributing the same substantially uniformly over the surface upon which it is to be laid and while the material is maintained upon such surface, vibrating means operating upon the material as it is laid, the second recited means also operating to convey material over the laid work and deposit the same in spaces formed in the laid material after the latter has been operated upon by said vibrating means, a plate carried by the machine and adapted to pass over and in contact with the material which has been vibrated by the said vibrating means and the material filled therein, and means for vibrating said plate.

6. A pavement laying machine embodying a wheel supported structure, means for advancing the machine to a supply of material, means carried by the machine for engaging and removing the material from said supply and for distributing the material to predetermined thickness upon the surface upon which it is to be laid and while the material is maintained upon such surface, vibrator plates operating upon the work as it is laid, means individual to the plates for vibrating them, and means resiliently supporting said plates from the machine.

7. A pavement laying machine embodying a wheel supported structure, means for advancing the machine to a supply of material, means carried by the machine for engaging and removing the material from said supply and for distributing the material substantially uniformly upon the surface upon which it is to be laid and while the material is maintained upon such surface, vibrator plates operating upon the work as it is laid, upstanding flanges at the front and rear of said plates, means individual to the plates for vibrating them, and means resiliently supporting said plates from the machine.

8. A pavement laying machine embodying a wheel supported structure, means for advancing the machine to a supply of material, means carried by the machine for engaging and removing the material from said supply and for distributing the material substantially uniformly upon the surface upon which it is to be laid and while the material is maintained upon such surface, vibrator plates operating upon the work as it is laid, means individual to the plates for vibrating them, means for resiliently supporting the plates for vertical movements, and resilient means for yieldingly resisting the movement of said plates in a horizontal plane and with respect to their supporting structure.

9. A pavement laying machine embodying a supporting structure adapted to be advanced to a supply of material, a vibrator plate carried by the structure, means for vibrating the plate, and means for removing the material from the supply and for distributing the same upon the surface upon which it is to be laid in advance of said plate and while the material is maintained upon such surface, the last said means also operating to convey a portion of the material to the rear of the plate to be deposited upon the laid material.

10. A pavement laying machine embodying a supporting structure adapted to be advanced to a supply of material, a vibrator plate carried by the structure, means for vibrating the plate, means for removing the material from the supply and for distributing the same upon the surface upon which it is to be laid in advance of said plate and while the material is maintained upon such surface, and another vibrator plate disposed in the rear of and spaced from the first said plate and between which plates a portion of the material which is removed from the said supply is deposited by the first said means.

11. A pavement laying machine embodying a supporting structure adapted to be advanced to a supply of material, a vibrator plate carried by the structure, means for vibrating the plate, means for removing the material from the supply and for distributing the same upon the surface upon which it is to be laid in advance of said plate and while the material is maintained upon such surface, another vibrator plate disposed in the rear of and spaced from the first said plate and between which plates a portion of the material which is removed from the said supply is deposited by the first said means, and means individual to the plates for vibrating them.

12. A pavement laying machine embodying a supporting structure adapted to be advanced to a supply of material, a vibrator plate carried by the structure, means for vibrating the plate, means for removing the material from the supply and for distributing the same upon the surface upon which it is to be laid in advance of said plate and while the material is maintained upon such surface, another vibrator plate disposed in the rear of and spaced from the first said plate and between which plates a portion of the material which is removed from the said supply is deposited by the first said means, means individual to the plates for vibrating them, and means individual to the plates and adapted to be set to cause all portions of the respective plates to vibrate in synchronism.

13. A pavement laying machine embodying a supporting structure adapted to be advanced to a supply of material, a vibrator plate carried by the structure, means for vibrating the plate, means for removing the material from the supply and for distributing the same upon the surface upon which it is to be laid in advance of said plate and while the material is maintained upon such surface, the last said means also operating to convey a portion of the material to the rear of the plate to be deposited upon the laid material, and means for adjustably and yieldingly mounting the vibrator plate with respect to the said supporting structure.

14. A pavement laying machine embodying a supporting structure adapted to be advanced to a supply of material, a plurality of conveying means carried by the structure to engage and remove the material from said supply and distribute the same over the surface upon which it is to be laid and while the material is maintained upon such surface, means for actuating the conveying means in opposite directions, a vibrator plate operating upon the material as it is laid, and means for vibrating the plate.

15. A pavement laying machine embodying a supporting structure adapted to be advanced to a supply of material, a plurality of conveying means carried by the structure to engage and remove the material from said supply and distribute the same over the surface upon which it is to be laid and while the material is maintained upon such surface, means for actuating the conveying means in opposite directions, a vibrator plate, and means for vibrating the plate, the said conveying means operating to distribute the material both in advance and in the rear of said plate.

16. A pavement laying machine embodying means for conveying the material away from the front of the machine and distributing the same over the surface upon which it is to be laid and while the material is maintained upon such surface, the said means also operating to return a portion of such material back to the front of the machine.

17. A pavement laying machine embodying means for removing material from a supply and conveying the same away from the front of the machine and distributing it over a surface upon which it is to be laid and while the material is maintained upon such surface, a portion of the material thus removed from the supply being directed back again to and in advance of the front of the machine.

18. A pavement laying machine embodying means for conveying the material away from the front of the machine and distributing the same over the surface and upon which it is to be laid and while the material is maintained upon such surface, the said means having a constant direction of travel and also operating to return a portion of such material back to the front of the machine.

19. A machine of the character described embodying a member for contacting the work, means for vibrating said member, and means for supporting said member for vibration in any direction, the last said means confining the movements of said member.

20. A machine of the character described embodying two plates to contact the work, said plates being spaced from each other, means for selectively vibrating the plates, and means for maintaining a supply of material between the plates.

21. A machine of the character described embodying means for spreading material over a surface in advance of the machine, said means also operating to convey excess material from the area being laid and then back to an area in advance of the previously laid material.

22. A machine of the character described embodying a plate to contact the work, means for vibrating the plate, and means for supporting said plate in a manner that the amplitude of the movement of the plate by the vibrating means may be controlled.

DELL G. CLIFFORD.